United States Patent [19]

Jaeger

[11] Patent Number: 5,530,734
[45] Date of Patent: Jun. 25, 1996

[54] X-RAY CASSETTE HOLDING AND POSITIONING DEVICE

[75] Inventor: Wolfgang Jaeger, Neunkirchen, Germany

[73] Assignee: Siemens Aktiengesellschaft, Munich, Germany

[21] Appl. No.: 373,988

[22] Filed: Jan. 18, 1995

[30] Foreign Application Priority Data

Jan. 31, 1994 [DE] Germany .......................... 44 02 839.3

[51] Int. Cl.⁶ .................................................. G03B 42/04
[52] U.S. Cl. .......................... 378/181; 378/172; 378/173
[58] Field of Search .................................... 378/181, 182, 378/187, 167, 169, 172, 173

[56] References Cited

U.S. PATENT DOCUMENTS

| 4,845,734 | 7/1989 | Maki et al. ............................... 378/181 |
| 5,349,628 | 9/1994 | Taniguruma et al. ................... 378/181 |

FOREIGN PATENT DOCUMENTS

| 1949764 | 4/1971 | Germany . |
| 3036195 | 4/1982 | Germany . |
| 3034282 | 4/1982 | Germany . |

*Primary Examiner*—Don Wong
*Attorney, Agent, or Firm*—Hill, Steadman & Simpson

[57] ABSTRACT

An x-ray target device for holding and positioning an x-ray film cassette in a radiological examination apparatus has a first assembly for the introduction or removal of a cassette into or out of a transfer region and a second assembly for holding for positioning the cassette sideways. A single drive is provided for operating both assemblies, with the driving connection between the single drive and the second assembly being disengaged when the second assembly is in the transfer region, but the driving connection is engaged otherwise. The second assembly carries a pair of gripping elements which are movable toward each other to grip the cassette therebetween. The second assembly is movable between the transfer region and an exposure region in the device. Another single drive is provided for moving the gripper elements and for moving the second assembly between the transfer and exposure regions.

18 Claims, 2 Drawing Sheets

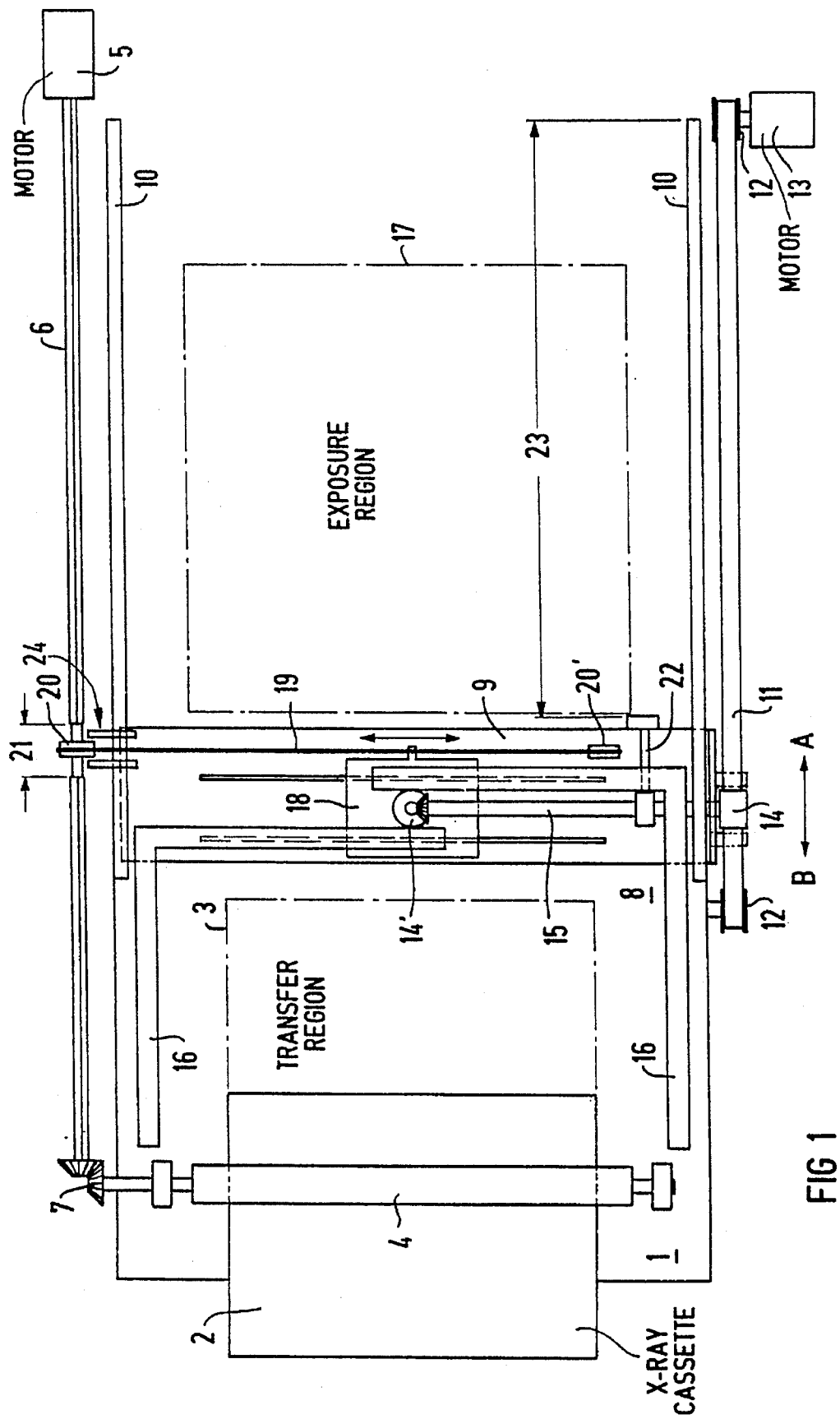

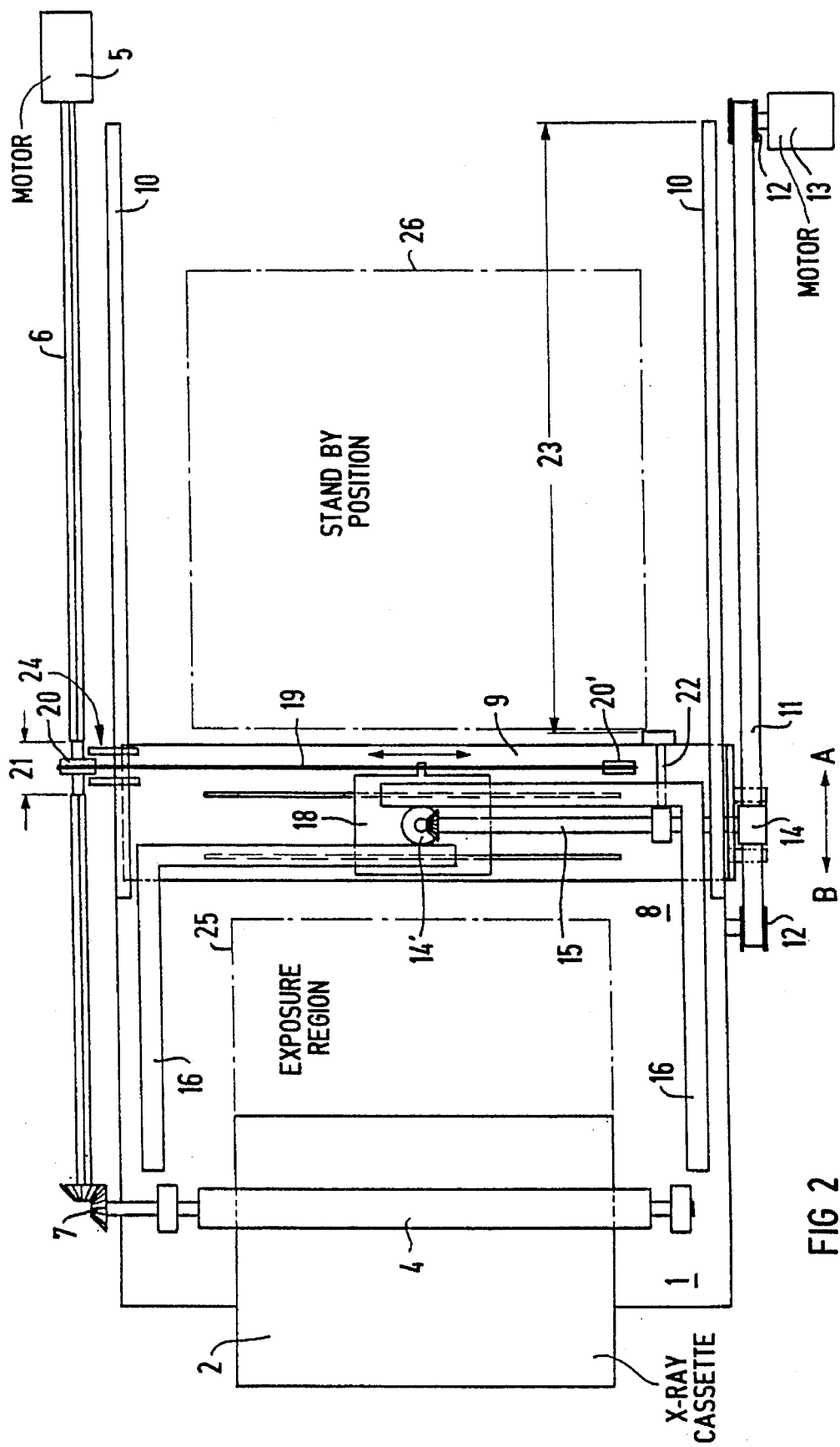

X-RAY CASSETTE HOLDING AND POSITIONING DEVICE

BACKGROUND OF THE INVENTION

1. Field of the Invention

The present invention is directed to a device for holding and positioning an x-ray cassette in a radiological examination apparatus, sometimes referred to as an "x-ray target device."

2. Description of Related Art

German OS 30 34 282 discloses an x-ray target device having a cassette carriage for conveying an x-ray film cassette from a standby or readiness position into an exposure position and vice versa. A cassette frame for the acceptance of the x-ray film cassette is adjustable perpendicularly relative to the cassette carriage (i.e., sideways within the carriage. The cassette carriage can be conveyed into the readiness or into the exposure position via a first geared motor and a traction cable. In the exposure position, the cassette frame can be adjusted perpendicularly relative to the cassette carriage by a further geared motor that is in communication via a square shaft with a toothed belt conducted around a toothed pulley.

Two conveying paths arranged lying opposite one another for an x-ray film cassette are adjustable relative to one another via respective drives in an x-ray target device disclosed in German OS 30 36 195. One conveying path is implemented with a conveyor belt that can be driven by a third drive.

An x-ray cassette holder and positioning device is disclosed in German PS 43 32 427, which is a "parent" to the German application corresponding to the present application. As disclosed therein, a device for conveying a cassette has at least one driveable drum that enables adjustment of the cassette into or out of a readiness position, by means of frictional engagement with a cassette surface. In the readiness position, the cassette is held by two collet chucks that are oppositely adjustable relative to one another. The collet chucks are seated at a carriage that is adjustable at guides. The carriage is coupled to a cable that extends along the guides and that is conducted around deflectors. A further drive engages at the cable for the adjustment thereof. The cassette can thus be adjusted from the readiness position into an exposure position.

SUMMARY OF THE INVENTION

An object of the present invention is to implement an x-ray target device of the type generally described above which can be economically manufactured and which provides possibilities for conveying and positioning the cassette that are unlimited in comparison to the prior art.

This object is achieved in accordance with the principles of the present invention in an x-ray cassette holding and positioning device having a first assembly for introducing a cassette into and removing the cassette from a transfer region in the device. The device has a cassette receptacle assembly for positioning the cassette sideways and which carries adjustable chucks to grip the cassette in the transfer region. A single drive is provided for operating both the introduction or removal assembly and the receptacle assembly. A driving connection between the single drive and the cassette receptacle assembly is disengaged in the transfer region, but remains engaged elsewhere.

An advantage of the invention is that the introduction or removal and the sideways positioning of the cassette ensue with only one drive, so that the device is economically manufacturable by eliminating a drive. In the transfer region, the single drive acts on the assembly for introducing or removing the cassette, but there is no interactive, driving connection between the drive and the cassette receptacle assembly. After the cassette has been inserted and is gripped by the cassette receptacle assembly in the transfer region, the cassette is moved out of the transfer region and an interactive connection between the drive and the cassette receptacle assembly is produced, so that sideways positioning of the cassette is possible.

For an uncomplicated structure, the drive produces the interactive connection with a shaft, and the shaft has at least one first region wherein the drive is coupled to the cassette receptacle assembly for the sideways adjustment thereof and a second region wherein there is no coupling, and the shaft is coupled to a drum engageable with a surface of the cassette. The shaft rotates the drum to introduce or remove the cassette. Such a shaft can be economically obtained as a standard profiled part, i.e., a shaft having a non-circular cross section. A region wherein the coupling to the cassette receptacle assembly is disengaged can be produced on such a shaft with less complicated methods.

In a further embodiment the shaft is aligned parallel to a running (transport) direction of the cassette receptacle assembly, and the receptacle assembly has a carriage having collet chucks for gripping the cassette which are adjustable along a transverse axis oriented approximately perpendicularly relative to the running direction. A cable is guided around wheels and that are seated at the carriage, the cable extending along the transverse axis and being connected to the carriage. One wheel is rotatable by the shaft, when that wheel is located at the aforementioned first region along the shaft. Sideways positioning of the cassette along the transverse axis is thus possible in a simple way because the one wheel has no interactive connection to the shaft in the transfer region, but it has an interactive connection with the shaft elsewhere.

A further cost savings is achieved by using a single drive (different from the aforementioned drive) for the adjustment of a carriage of the cassette receptacle assembly along its running direction and for an oppositely directed adjustment of collet chucks seated on the carriage.

This further drive is in communication with a drive loop that extends along the running direction and is guided around wheels, the carriage and the collet chucks being coupled such to the drive loop so that an oppositely directed adjustment of the collet chucks is effected as the loop is driven for an initial period, followed by an adjustment of the carriage as the loop is further driven.

A mechanically uncomplicated coupling between the drive loop and the collet chucks is achieved by providing a rod extending along the transverse axis and having an interactive connection with wheels that are seated at the carriage. The collet chucks are moved in opposite directions by a wheel disposed between the collet chucks and having a beveled gear engagement with the rod. A further wheel on the rod is driven by the drive loop. Given an initial drive period of the loop, the collet chucks are thus adjusted into final positions gripping the cassette. Thereafter, rotation of the profiled rod by the further wheel is prevented; as a result a coupling between the carriage and the loop is effected. Given a further drive of the loop in the same direction, transport of the receptacle assembly ensues in the running direction. In order to produce an especially good interactive connection, preferably the drive loop is a toothed belt.

DESCRIPTION OF THE DRAWING

Plan views of an x-ray target device constructed in accordance with the principles of the present invention are shown in FIGS. 1 and 2.

DESCRIPTION OF THE PREFERRED EMBODIMENTS

In the exemplary embodiment of an x-ray target device of the invention shown in the drawing, an assembly 1 for the introduction or removal of a cassette 2 into or out of a transfer region 3 within the device 1 (such as in a housing) is provided. To this end, the assembly 1 has a drum 4 that is rotatable around its longitudinal axis. A first drive 5, such as a motor, rotates a shaft 6 and beveled gearing 7 engages the drum 4 for rotation thereof around its longitudinal axis. By operating the first drive 5, the cassette 2 can be moved into the transfer region 3 by frictional engagement between a surface of the cassette 2 and the drum 4.

A cassette receptacle assembly 8 is provided that has a carriage 9 seated so as to be movable in a running direction along guides 10. For moving the carriage 9, a drive loop 11, preferably toothed belt with teeth on its inner and outer surfaces, is provided that extends along the guides 10, and which is guided around deflectors such as wheels 12. One of the wheels 12 is rotated by a second drive 13, such as a motor. Wheels 14 and 14' are seated at the carriage 9, these being coupled to one another by a rod 15 (which may be a profiled rod) which is aligned approximately perpendicularly relative to the running direction. The wheel 14' is part of a beveled gear arrangement at an end of the rod 15 and disposed between and engaged with the collet chucks 16 so that, given an rotation of the rod 15, the collet chucks are adjusted oppositely relative to one another. The wheel 14' has an interactive driving connection with the drive loop 11, for example, at the outer surface of the drive loop 11, so that the collet chucks 16 are oppositely adjusted relative to one another when the second drive 13 is operated from an initial period.

For transporting the cassette 2 from the transfer region 3 to an exposure region 17, the second drive 13 is operated, causing movement of the drive loop 11 in a first direction A, and the collet chucks 16 are adjusted toward one another via the second wheels 14 and 14', and the rod 15. The collet chucks 16 engage the opposite edge of the cassette 2 and, given a corresponding pressing force that can be set, for example, by the adjustment resistance of the carriage 9, block (prevent) further rotation of the second wheels 14 and 14', and the rod 15. As a result, the carriage 9 is drivingly coupled to the drive loop 11, so that movement of the carriage 9 along the guides 10 in the direction A ensues given continued operation of the second drive 13. The cassette 2 can thus be moved from the transfer region 3 into an exposure region 17.

For sideways positioning of the cassette 2, the collet chucks 16 are moveable parallel to the transverse axis in guides of the first carriage 9 by means of a further carriage 18, seated on the carriage 9. The further carriage 18 engages a further drive loop 19, such as a cable, that is directed parallel to the transverse axis and that is guided around two wheels 20 and 20, that are likewise seated at the carriage 9. The wheel 20 is thus adjustable in position along the shaft 6. The shaft 6 profiled (non-circular) except in a region 21 wherein the interactive connection between the third wheel 20 and the shaft 6 is disengaged. To this end, the region 21 can, for example, have a circular cross section, so that the circular interior opening of the wheel 20 is matched to the profile of the shaft 6 in that region and has no interactive (driving) connection with the shaft 6. An interlocking mechanism 24 preferably holds the wheel 20 in a position wherein its interior opening can freely rotate around the shaft 6. This interlock takes effect when the cassette receptacle assembly 8 is located in the transfer region 3. Movement of the cassette receptacle assembly 8 into the exposure region 17 effects an interlocking gliding of the third wheel 20 along the shaft 6, so that a coupling to the first drive 5 exists. By operating the first drive 5, an adjustment of the further carriage 18 along the transverse axis for sideways positioning the cassette 2 is possible via the coupled wheel 20 and via the drive loop 19.

Movement of the cassette receptacle assembly 8 from the exposure region 17 back into the transfer region 3 ensues by operating the second drive 13 to move the drive loop 11 in an opposite direction B, whereby the collet chucks 16 are opened via the second wheels 14 and 14' and the rod 15 in the final position of the carriage 9.

In order to prevent opening of the collet chucks 16 when the second drive 13 is operated in this opposite direction, a friction brake 22, for example engages the rod 15. The frictional action of the friction brake 22 is set such that no movement of the collet chucks 16 uses given a drive of the second drive 13 for moving the cassette receptacle assembly 8 in direction B and the frictional action is only overcome when the cassette receptacle assembly 8 reaches the final position. Any type of rotation blocking device that is effective in a region 23 but having no effect at the final position of the carriage 8; any other blocking device fulfilling this purpose can be employed instead of the friction brake 23.

An interactive connection between the cassette 2 and the drum 4 is then produced again in the transfer region 3, so that the cassette 2 is moved out of the transfer region 3 given operation of the first drive 5.

According to the invention, thus, only one drive 5 for the introduction or removal of the cassette 2 into or out of a transfer region 3 and for sideways positioning the cassette 2 is required.

Moreover, only a single drive 13 is inventively provided for the adjustment of the collet chucks 16 and movement of the carriage 9, thereby eliminating a need for respective separate drives for the collet chucks 16 and the carriage 9, while permitting unlimited possibilities of conveying and positioning the cassette 2.

Although modifications and changes may be suggested by those skilled in the art, it is the intention of the inventor to embody within the patent warranted hereon all changes and modifications as reasonably and properly come within the scope of his contribution to the art.

For example the invention covers a device which is shown in FIG. 2 and whereby the cassette 2 is moved from a transfer region 3 to a standby position 24 and can be moved by the cassette receptacle assembly 8 into the exposure region 25.

I claim as my invention:

1. A device for use with an x-ray cassette for holding and positioning said x-ray cassette, comprising:

means for moving said x-ray cassette into and out of a transfer region along a transfer direction;

cassette receptacle means for receiving said x-ray cassette in said transfer region and for subsequently positioning said x-ray cassette sideways relative to said transfer direction;

single drive means for operating said means for moving said x-ray cassette and said cassette receptacle means; and connecting means for temporarily disengaging said single drive means from said cassette receptacle means when said cassette receptacle means is in said transfer region and for otherwise engaging said single drive means and said cassette receptacle means.

2. A device as claimed in claim 1 wherein said means for moving said x-ray cassette includes a rotatable element, wherein said drive means includes a shaft mechanically engaging said rotatable element, said shaft having a first region and a second region disposed along a length of said shaft, and wherein said connecting means includes a driven element movable with said cassette receptacle means along said length of said shaft and making a driving connection with said shaft in said first region and disengaging said driving connection in said second region.

3. A device as claimed in claim 2 wherein said rotatable element comprises a drum engageable with a surface of said x-ray cassette.

4. A device as claimed in claim 2 wherein said cassette receptacle means comprises:

a carriage;

a pair of collet chucks mounted on said carriage for gripping said cassette in said transfer region;

adjustment means on said carriage, engaging said collet chucks, for moving said collet chucks in opposite directions along a transverse axis substantially perpendicular to said length of said shaft for bringing said collet chucks into gripping engagement with said cassette;

a drive loop entrained around two wheels and attached to said carriage for moving said carriage along said transverse axis, with one of said wheels comprising said driven element.

5. A device as claimed in claim 4 wherein said shaft has a non-circular cross section in said first region and a circular cross section in said second region, and wherein said one of said wheels comprising said driven element has an interior opening having a shape causing said one of said wheels to co-rotate with said shaft in said first region and causing said shaft to rotate inside one of said wheels in said second region.

6. A device as claimed in claim 4 wherein said cassette receptacle means has a further carriage on which said carriage and said collet chucks are mounted, and said device further comprising further single drive means drivingly engaging said collet chucks and said further carriage for displacing said collet chucks along said transverse axis to grip said cassette and for transporting said cassette receptacle means from said transfer region to an exposure region in said device in a direction substantially parallel to said length of said shaft.

7. A device as claimed in claim 6 wherein said further single drive means includes a drive loop entrained around spaced drive loop wheels and extending substantially parallel to said length of said shaft, said guide loop engaging said further carriage and, when driven causing said cassette receptacle means to move between said transfer region and said exposure region, and means for mechanically coupling said collet chucks to said drive loop for causing said collet chucks, when said guide loop is driven in a direction for moving said cassette receptacle means from said transfer region to said exposure region, causing said collet chucks to move together in opposite directions to grip said x-ray cassette.

8. A device as claimed in claim 7 wherein said means for coupling said collet chucks to said drive loop comprises:

a rod having a longitudinal axis and mounted for rotation around said longitudinal axis on said further carriage;

a wheel mounted at one end of said rod engaging said drive loop;

a wheel mounted at an opposite end of said rod, on said carriage, and disposed between and engaging said collet chucks; and a driving connection between said opposite end of said rod and said wheel mounted on said carriage for causing rotation of said wheel mounted on said carriage to displace said collet chucks as said drive loop is driven.

9. A device as claimed in claim 8 wherein said drive loop comprises a toothed belt.

10. A device for use with an x-ray cassette for holding and positioning said x-ray cassette, comprising:

cassette receptacle means for receiving said x-ray cassette;

means for transporting said cassette receptacle means with an x-ray cassette received in said cassette receptacle means from a first region to a second region of said device;

two gripper elements mounted on said cassette receptacle means so as to be movable toward each other for gripping an x-ray cassette therebetween;

single drive means drivingly engaging said means for transporting said cassette receptacle means and said gripper elements for moving said gripper elements toward each other to grip said x-ray cassette in said first region and for transporting said cassette receptacle means along a transport direction between said first and second positions:

means for moving said x-ray cassette into and out of said first region;

said cassette receptacle means comprising means for positioning said x-ray cassette sideways relative to said transport direction;

further single drive means for operating said means for moving said x-ray cassette and said means for positioning said x-ray cassette; and connecting means for temporarily disengaging said further single drive means from said means for positioning when said cassette receptacle means is in said first position and for otherwise engaging said further single drive means and said means for positioning.

11. A device as claimed in claim 10 wherein said means for moving said x-ray cassette includes a rotatable element, wherein said further single drive means includes a shaft mechanically engaging said rotatable element, said shaft having a first portion and a second portion disposed along a length of said shaft, and wherein said connecting means includes a driven element movable with said cassette receptacle means along said length of said shaft and making a driving connection with said shaft in said first portion and disengaging said driving connection in said second portion.

12. A device as claimed in claim 11 wherein said rotatable element comprises a drum engageable with a surface of said x-ray cassette.

13. A device as claimed in claim 12 wherein said cassette receptacle means comprises:

a carriage, on which said gripper elements are mounted;

adjustment means on said carriage, engaging said gripper elements for moving said gripper elements in opposite directions along a transverse axis substantially perpendicular to said length of said shaft for bringing said gripper elements into gripping engagement with said cassette;

a drive loop entrained around two wheels and attached to said carriage for moving said carriage along said transverse axis, with one of said wheels comprising said driven element.

14. A device as claimed in claim 13 wherein said shaft has a non-circular cross section in said first portion and a circular cross section in said second portion, and wherein said one of said wheels comprising said driven element has an interior opening having a shape causing said one of said wheels to co-rotate with said shaft in said first portion and causing said shaft to rotate inside one of said wheels in said second portion.

15. A device as claimed in claim 13 wherein said cassette receptacle means has a further carriage on which said carriage and said gripper elements are mounted, and said single drive means drivingly engaging said gripper elements and said further carriage for displacing said gripper elements along said transverse axis to grip said cassette and for transporting said cassette receptacle means from said first position to said second position in said device in a direction substantially parallel to said length of said shaft.

16. A device as claimed in claim 15 wherein said single drive means includes a drive loop entrained around spaced drive loop wheels and extending substantially parallel to said length of said shaft, said guide loop engaging said further carriage and, when driven causing said cassette receptacle means to move between said first position and said second position, and means for mechanically coupling said gripper elements to said drive loop for causing said gripper elements, when said guide loop is driven in a direction for moving said cassette receptacle means from said first position to said second position, causing said gripper elements to move together in opposite directions to grip said x-ray cassette.

17. A device as claimed in claim 16 wherein said means for coupling said gripper elements to said drive loop comprises:

a rod having a longitudinal axis and mounted for rotation around said longitudinal axis on said further carriage;

a wheel mounted at one end of said rod engaging said drive loop;

a wheel mounted at an opposite end of said rod, on said carriage, and disposed between and engaging said gripper elements; and a driving connection between said opposite end of said rod and said wheel mounted on said carriage for causing rotation of said wheel mounted on said carriage to displace said gripper elements as said drive loop is driven.

18. A device as claimed in claim 17 wherein said drive loop comprises a toothed belt.

* * * * *